(12) United States Patent
Hsieh

(10) Patent No.: US 12,332,516 B2
(45) Date of Patent: Jun. 17, 2025

(54) ELECTRONIC DEVICE

(71) Applicant: InnoLux Corporation, Miao-Li County (TW)

(72) Inventor: Hong-Sheng Hsieh, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/401,726

(22) Filed: Jan. 2, 2024

(65) Prior Publication Data

US 2024/0248344 A1    Jul. 25, 2024

(30) Foreign Application Priority Data

Jan. 19, 2023  (CN) .......................... 202310074297.5

(51) Int. Cl.
*G02F 1/00* (2006.01)
*G02F 1/1335* (2006.01)
*G02F 1/13357* (2006.01)

(52) U.S. Cl.
CPC .. *G02F 1/133603* (2013.01); *G02F 1/133607* (2021.01)

(58) Field of Classification Search
CPC ...................... G02F 1/133607; G02F 1/133603
See application file for complete search history.

(56) References Cited

U.S. PATENT DOCUMENTS

| | | | |
|---|---|---|---|
| 11,842,701 B1 | 12/2023 | Wan | |
| 2020/0096822 A1* | 3/2020 | Liu | ................... G02F 1/133512 |
| 2020/0312821 A1* | 10/2020 | Yan | ......................... H01L 24/31 |
| 2023/0269993 A1* | 8/2023 | Sekine | ................... H10K 59/38 |
| | | | 257/40 |
| 2024/0027672 A1 | 1/2024 | Zhu | |
| 2024/0264486 A1* | 8/2024 | Chen | ................ G02F 1/133603 |

FOREIGN PATENT DOCUMENTS

| | | |
|---|---|---|
| CN | 108761854 A | 11/2018 |
| CN | 113777692 A | 12/2021 |
| CN | 115327820 A | 11/2022 |
| TW | 201930936 A | 8/2019 |
| TW | 202132869 A | 9/2021 |

* cited by examiner

Primary Examiner — Gerald J Sufleta, II
(74) Attorney, Agent, or Firm — Winston Hsu

(57) ABSTRACT

An electronic device includes a light emitting device, and the light emitting device emits a light towards a light-emitting direction. The light emitting device includes a substrate, a first light emitting component and a second light emitting component. The first light emitting component is disposed on the substrate, and the first light emitting component includes a first light emitting unit and a first light controlling unit, wherein the first light controlling unit is disposed on the first light emitting unit in the light-emitting direction, and the first light emitting component provides a first light with a first light type. The second light emitting component is disposed on the substrate, and the second light emitting component includes a second light emitting unit, wherein the second light emitting component provides a second light with a second light type, and the first light type is different from the second light type.

10 Claims, 13 Drawing Sheets

ELECTRONIC DEVICE

BACKGROUND OF THE DISCLOSURE

1. Field of the Disclosure

The present disclosure relates to an electronic device, and more particularly to an electronic device with a function of privacy screen.

2. Description of the Prior Art

As the evolution and development of electronic devices, the electronic devices have become an indispensable item. The electronic devices such as light emitting devices (or display devices) provide more convenient information transmission or image display. However, in order to enhance the privacy when viewing the electronic device and/or to prevent specific persons from viewing the electronic device for increasing safety, the electronic device needs a design which is capable of controlling the light route, so as to make the electronic device have a function of privacy screen.

SUMMARY OF THE DISCLOSURE

According to an embodiment, the present disclosure provides an electronic device including a light emitting device, wherein the light emitting device emits a light towards a light-emitting direction. The light emitting device includes a substrate, a first light emitting component and a second light emitting component. The first light emitting component is disposed on the substrate, and the first light emitting component includes a first light emitting unit and a first light controlling unit, wherein the first light controlling unit is disposed on the first light emitting unit in the light-emitting direction, and the first light emitting component provides a first light with a first light type. The second light emitting component is disposed on the substrate, and the second light emitting component includes a second light emitting unit, wherein the second light emitting component provides a second light with a second light type, and the first light type is different from the second light type.

According to another embodiment, the present disclosure provides an electronic device including a light emitting device, wherein the light emitting device emits a light towards a light-emitting direction. The light emitting device includes a substrate, a plurality of light controlling units, a first light emitting component and a second light emitting component. The light controlling units are disposed on the substrate. The first light emitting component is disposed on the substrate, and the first light emitting component includes a first light emitting unit and a first light controlling unit, wherein the first light controlling unit disposed on a side of the first light emitting unit in a side direction of the first light emitting unit, the side direction of the first light emitting unit is not parallel to the light-emitting direction, the light controlling units include the first light controlling unit, and the first light emitting component provides a first light with a first light type. The second light emitting component is disposed on the substrate, and the second light emitting component includes a second light emitting unit, wherein the second light emitting component provides a second light with a second light type, and the first light type is different from the second light type. A reference light controlling unit is one light controlling unit among the plurality of light controlling units closest to the second light emitting unit, the first light emitting component or the second light emitting component includes the reference light controlling unit, and a first distance between the first light emitting unit and the first light controlling unit is different from a second distance between the second light emitting unit and the reference light controlling unit.

DETAILED DESCRIPTION

Figure 1:
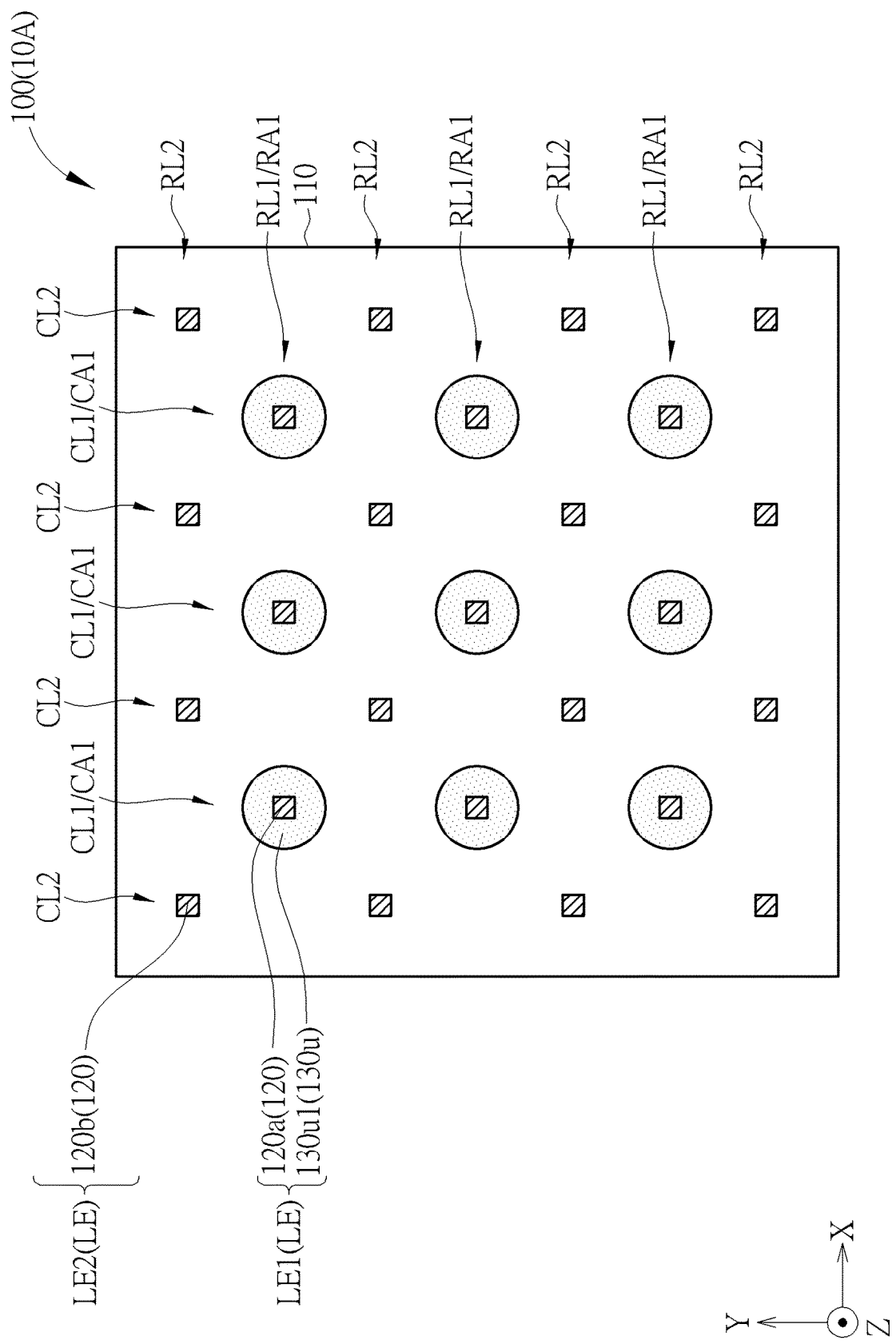
FIG. 1 is a schematic diagram showing a top view of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of an electronic device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names.

This document does not intend to distinguish between components that differ in name but not function.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

In the description and following claims, the term "horizontal direction" generally means a direction parallel to a horizontal surface, the term "horizontal surface" generally means a surface parallel to a direction X and a direction Y in the drawings, the term "vertical direction" generally means a direction parallel to a direction Z in the drawings, and the direction X, the direction Y and the direction Z are perpendicular to each other (i.e., the horizontal direction is perpendicular to the direction Z). In the description and following claims, the term "top view" generally means a viewing result viewing along the vertical direction. In the description and following claims, the term "cross-sectional view" generally means a viewing result viewing a structure cutting along the vertical direction along the horizontal direction.

In the description and following claims, it should be noted that the term "overlap" means that two elements overlap along the direction Z, and the term "overlap" can be "partially overlap" or "completely overlap" in unspecified circumstances.

The terms "about", "substantially", "equal", or "same" generally mean within ±20% of a given value or range, or mean within ±10%, ±5%, ±3%, ±2%, ±1%, or ±0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the electronic device may include a light emitting device, a display device, a backlight device, an antenna device, a sensing device, a tiled device or a combination thereof, but not limited thereto. The light emitting device may be a foldable electronic device, a flexible electronic device or a stretchable electronic device. The display device may be a non-self-luminous type display device or a self-luminous type display device based on requirement(s), and the display device may be a color display device or a monochrome display device based on requirement(s). For example, the display device suitable for the present disclosure may be a liquid crystal display device, an organic light emitting diode (OLED) display device, a mini light emitting diode (mini LED) display device, a micro light emitting diode (micro LED) display device, but not limited thereto. The antenna device may be a liquid-crystal-type antenna device or a non-liquid-crystal-type antenna device, the sensing device may be a device for sensing capacitance, light, thermal or ultrasonic, and the tiled device may be a tiled display device or a tiled antenna device, but not limited thereto. Electronic components of the light emitting device may include passive component(s) and active component(s), such as capacitors, resistors, inductors, diodes and/or transistors. The diode may include a light emitting diode (LED) or a photodiode. The light emitting diode may include an OLED, a mini LED, a micro-LED, a quantum-dot LED (QLED, QDLED), but not limited thereto. The transistor may be a top gate thin film transistor, a bottom gate thin film transistor or a dual gate thin film transistor, but not limited thereto. The light emitting device may include fluorescence material, phosphor material, quantum dot (QD) material or other suitable material based on requirement(s), but not limited thereto. The light emitting device may have a peripheral system (such as a driving system, a control system, a light system, etc.) for supporting the device(s) and component(s) in the light emitting device. A shape of the light emitting device may be a polygon (e.g., a rectangle), a shape having a curved edge (e.g., a circle, an oval) or other suitable shape, but not limited thereto.

In the present disclosure, the light emitting device may have a light-emitting region configured to emit light (e.g., display an image), and the light-emitting region of the light emitting device emits a light towards the light-emitting direction. For example, the light-emitting direction of the present disclosure may be parallel to the direction Z in the drawings, but not limited thereto.

Figure 2:
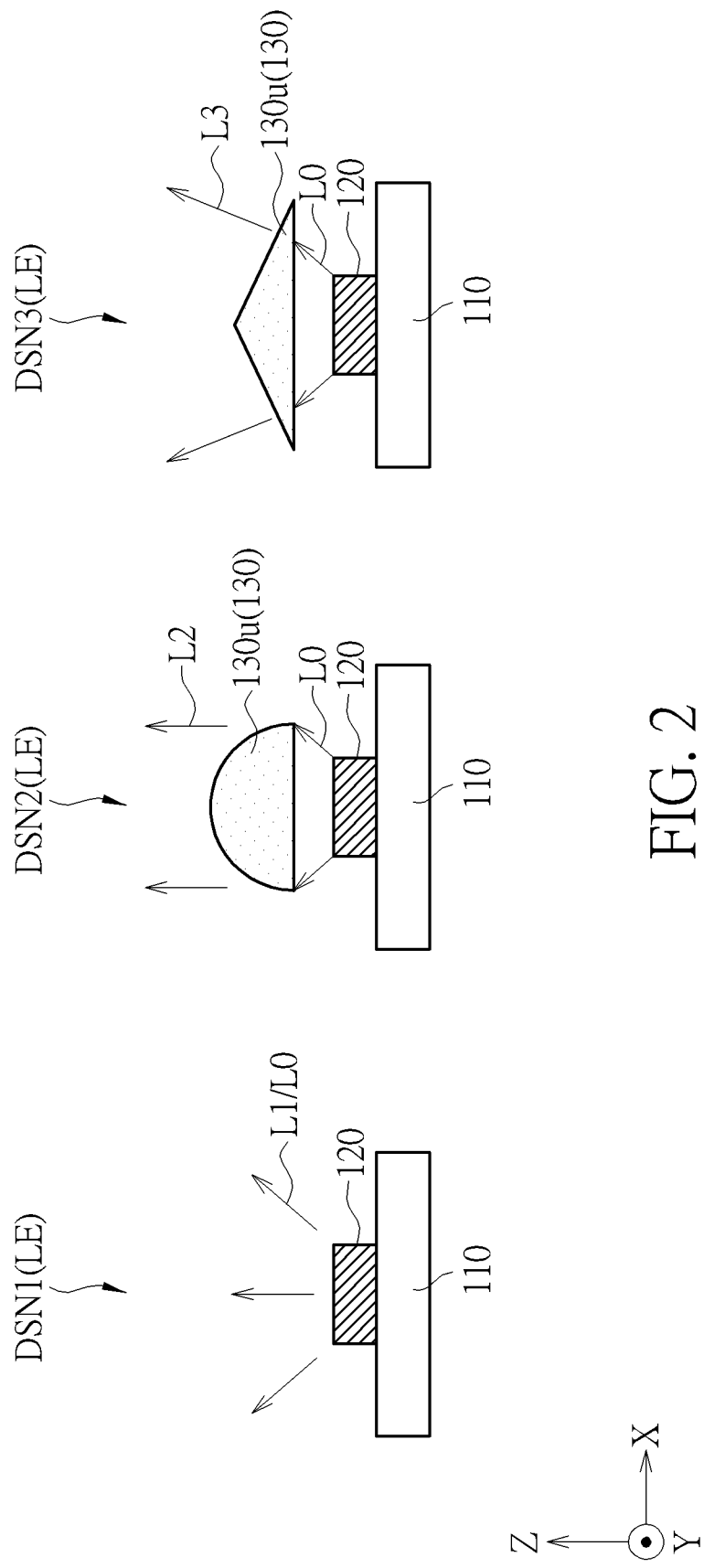
FIG. 2 is a schematic diagram showing cross-sectional views of exemplary designs of light emitting components according to the present disclosure.
Figure 3:
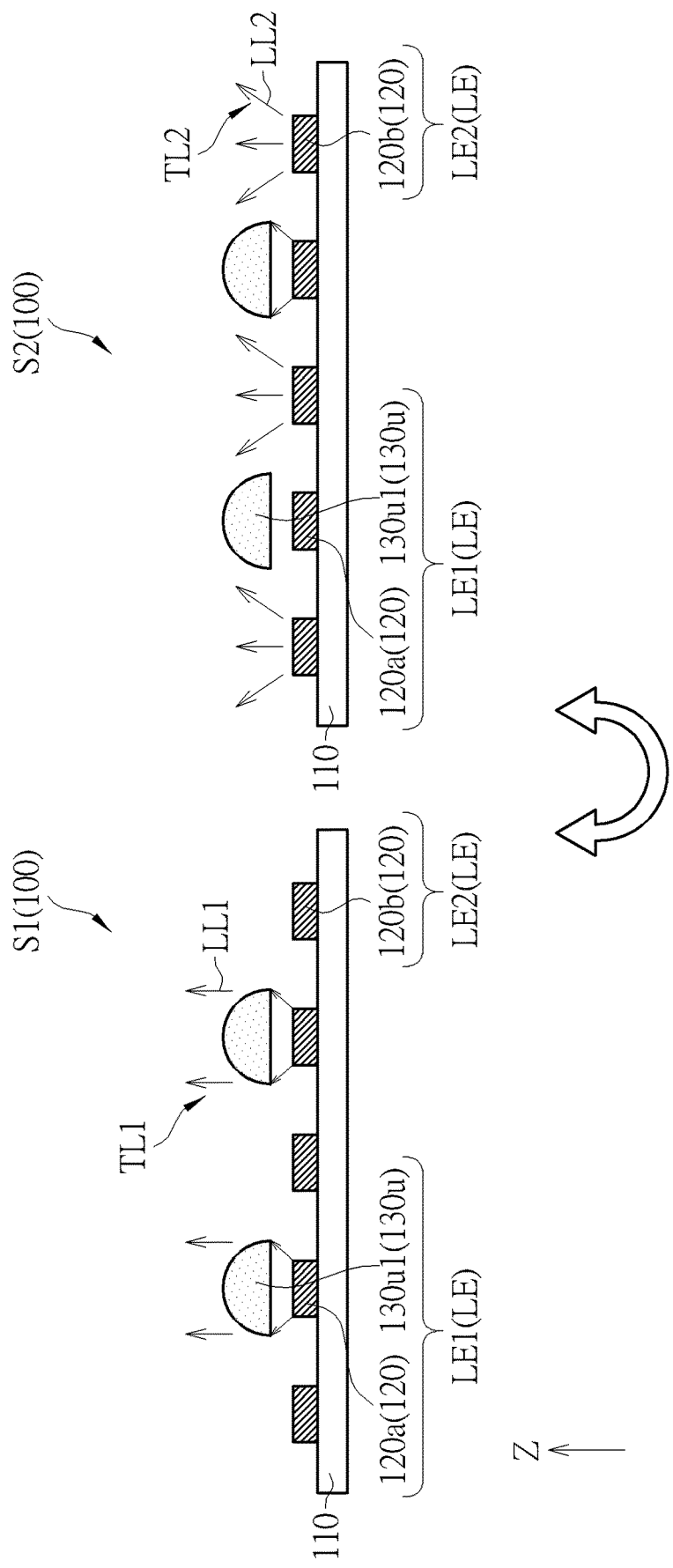
FIG. 3 is a schematic diagram showing a cross-sectional view of a light emitting device in a first lighting mode and a second lighting mode according to a first embodiment of the present disclosure.
Figure 4:
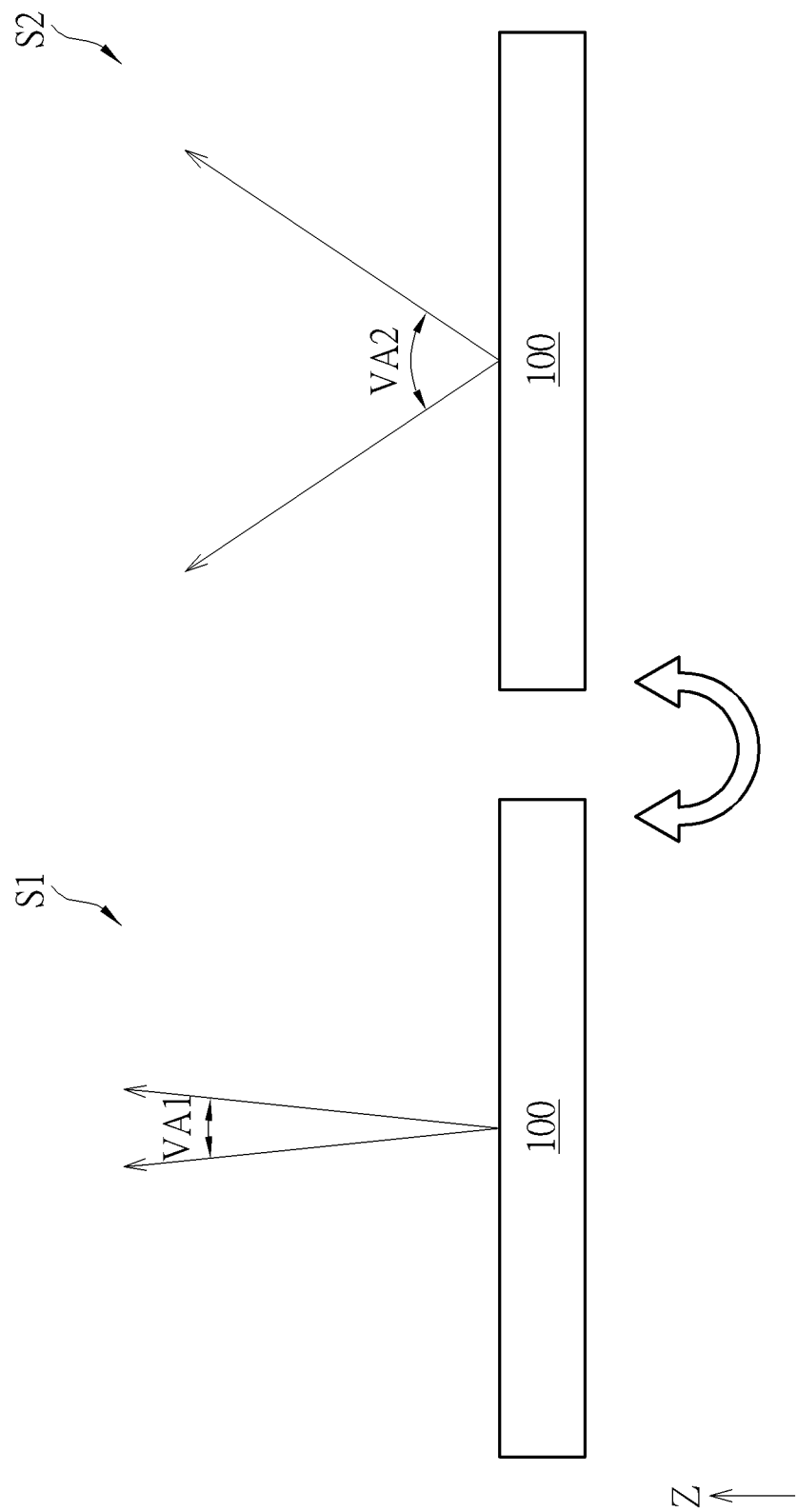
FIG. 4 is a schematic diagram showing view angles of a light emitting device in a first lighting mode and a second lighting mode according to a first embodiment of the present disclosure.

Referring to FIG. 1 to FIG. 4, FIG. 1 is a schematic diagram showing a top view of an electronic device 10A according to a first embodiment of the present disclosure, FIG. 2 is a schematic diagram showing cross-sectional views of exemplary designs of light emitting components according to the present disclosure, FIG. 3 is a schematic diagram showing a cross-sectional view of a light emitting device in a first lighting mode and a second lighting mode according to a first embodiment of the present disclosure, and FIG. 4 is a schematic diagram showing view angles of a light emitting device in a first lighting mode and a second lighting mode according to a first embodiment of the present disclosure. As shown in FIG. 1, the electronic device 10A includes a light emitting device 100, the light emitting device 100 may include a substrate 110 and a plurality of light emitting components LE disposed on the substrate 110. The substrate 110 may be a rigid substrate or a flexible substrate. Based on the type of the substrate 110, the substrate 110 may correspondingly include glass, quartz, ceramic, sapphire, polymer (e.g., polyimide (PI), polyethylene terephthalate (PET)), other suitable materials or a combination thereof.

As shown in FIG. 1, the light emitting device 100 may include a plurality of light emitting components LE disposed on the substrate 110. In FIG. 1, each light emitting component LE may include a light emitting unit 120 disposed on the substrate 110 and configured to emit the light, wherein the light emitting unit 120 may be any suitable light emitting unit. For example, the light emitting unit 120 may be a light emitting diode, but not limited thereto. In some embodiments, the light emitting unit 120 of the light emitting component LE may emit the light in multiple directions to serve as a scattered light source, but not limited thereto. Moreover, in the present disclosure, the color of the light emitted from the light emitting unit 120 may be designed based on requirement(s). In some embodiments (as shown in FIG. 1), the light emitting units 120 may emit the lights with the same color (e.g., the white light, the blue light or the light with other suitable color).

According to some embodiments, the light emitting components LE may include the light emitting components emitting the lights with different colors. In detail, in an embodiment, the light emitting components LE may include the light emitting units 120 emitting the lights with different colors (e.g., red light emitting units, green light emitting units, blue light emitting units). In detail, in another embodiment, the light emitting units 120 of the light emitting components LE may emit the lights with the same light, and the color conversion may be performed on the light emitting units 120 by a color conversion layer, such that the light emitting components LE may include the light emitting components emitting the lights with different colors (e.g., red light emitting components, green light emitting components and blue light emitting components). According to some embodiments, the light emitting device may be a display device, the red light emitting component, the green light emitting component and the blue light emitting component may constitute a pixel. According to some embodiments, the light emitting unit may be an OLED, a mini LED, a micro LED, or a combination thereof.

As shown in FIG. 1, the light emitting components LE of the light emitting device 100 may include a plurality of first light emitting components LE1 and a plurality of second light emitting components LE2. In detail, the first light emitting component LE1 and the second light emitting component LE2 are disposed on the substrate 110. The light emitting unit 120 included in the first light emitting component LE1 is referred as a first light emitting unit 120a, and the light emitting unit 120 included in the second light emitting component LE2 is referred as a second light emitting unit 120b. According to some embodiments, although the first light emitting unit 120a and the second light emitting unit 120b have different names, the structure and the lighting effect of the first light emitting unit 120a may be the same as the structure and the lighting effect of the second light emitting unit 120b. According to some embodiments, the first light emitting unit 120a and the second light emitting unit 120b may be the same. According to some embodiments, the first light emitting unit 120a and the second light emitting unit 120b may be different.

As shown in FIG. 1 and FIG. 3, in the present disclosure, the first light emitting component LE1 and the second light emitting component LE2 may be distinguished by the light types of their emitting lights. The light emitting device 100 emits the light towards the direction Z (the light-emitting direction). The first light emitting component LE1 includes a first light emitting unit 120a and a first light controlling unit 130u1 disposed on the first light emitting unit 120a in the direction Z (the light-emitting direction). The first light emitting component LE1 may provide a first light LL1 with a first light type TL1. The second light emitting component LE2 includes a second light emitting unit 120b. The second light emitting component LE2 may provide a second light LL2 with a second light type TL2. The first light type TL1 is different from the second light type TL2.

As shown in FIG. 3 and FIG. 4, in some embodiments, the first light LL1 of the first light emitting component LE1 has a first view angle VA1, and the first light LL1 causes the light emitting device 100 to have the first view angle VA1. The second light LL2 of the second light emitting component LE2 has a second view angle VA2, and the second light LL2 causes the light emitting device 100 to have the second view angle VA2. The first view angle VA1 may be less than the second view angle VA2, but not limited thereto. Namely, compared with the second light LL2 of the second light emitting component LE2, a collimating degree of the first light LL1 of the first light emitting component LE1 is higher, but not limited thereto. Note that the view angle is the angle range in which the user can clearly see the light of the light emitting device 100 (e.g., see the display image), and thus, when the first view angle VA1 is less than the second view angle VA2, a viewing range caused by the first view angle VA1 is smaller than a viewing range caused by the second view angle VA2. In the comparison of the collimating degree, when the collimating degree of the light is higher, a ratio of a sum of the light intensity of the light within a certain angle (for example, 10°) respecting to the direction Z to a total light intensity of the light is higher, wherein the measurement of the light intensity may be measured by a suitable brightness measuring instrument (e.g., a spectroradiometer, a conometer or other suitable instrument).

In the present disclosure, any suitable method may be used to make the first light LL1 generated by the first light emitting component LE1 have the first light type TL1, any suitable method may be used to make the second light LL2 generated by the second light emitting component LE2 have the second light type TL2. In some embodiments, the exemplary designs of the light emitting components LE shown in FIG. 2 may be applied to the first light emitting component LE1 and/or the second light emitting component LE2 shown in FIG. 1. In the exemplary design DSN1 shown in FIG. 2, the light emitting component LE includes a light emitting unit 120, but the light emitting component LE does not include another structure for adjusting the light path. Therefore, the light L0 generated by the light emitting unit 120 is the light L1 generated by the light emitting component LE. In the exemplary design DSN2 and the exemplary design DSN3 shown in FIG. 2, the light emitting component LE may include a light emitting unit 120 and a light controlling unit 130u disposed on the light emitting unit 120 in the direction Z (i.e., the light-emitting direction), so as to adjust the light L0 emitted from the light emitting unit 120 to form the light L2 or the light L3 with another light type. In some embodiments, the light controlling unit 130u of the exemplary design DSN2 and the light controlling unit 130u of the exemplary design DSN3 may be an optical film, and the light controlling unit 130u may include any suitable material. For example, the light controlling unit 130u may include glass, polymer (e.g., resin), crystal, other suitable material or a combination thereof, so as to make the light controlling unit 130u be a passive light controlling unit, but not limited thereto. In some embodiments, in FIG. 2, the light controlling unit 130u of the exemplary design DSN2 and the light controlling unit 130u of the exemplary design DSN3 may include a liquid crystal lens including the liquid crystal, such that the light controlling unit 130u may control the light through electric signal(s) and serve as an electrically controlled light-controlling unit (or referred as an active light controlling unit).

For example, the light controlling unit 130u of the exemplary design DSN2 shown in FIG. 2 may include a lens (e.g., a convex lens or a Fresnel lens), the light controlling unit 130u of the exemplary design DSN3 shown in FIG. 2 may include a prism (e.g., a triangular prism), but not limited thereto. For example, if the light controlling unit 130u of the exemplary design DSN2 shown in FIG. 2 includes liquid crystal molecules, the light controlling unit 130u of the exemplary design DSN2 may include a liquid crystal lens, but not limited thereto. In FIG. 2, since the exemplary design DSN2 and the exemplary design DSN3 additionally have the light controlling unit 130u configured to control the light generated by the light emitting unit 120 compared with the exemplary design DSN1, the light L2 generated by the light emitting unit 120 of the exemplary design DSN2 and the light L3 generated by the light emitting unit 120 of the exemplary design DSN3 have the light type with higher collimating degree compared with the scattering light L1 generated by the light emitting component LE of the exemplary design DSN1.

In the embodiment shown in FIG. 1, the light controlling unit 130u may include the first light controlling unit 130u1 belonging to the first light emitting component LE1 (i.e., the first light emitting component LE1 includes the first light controlling unit 130u1), the first light controlling unit 130u1 is disposed on the first light emitting unit 120a in the direction Z (i.e., the light-emitting direction), and the first light emitting unit 120a between the substrate 110 and the first light controlling unit 130u1), so as to adjust the light emitted from the first light emitting unit 120a. Therefore, the first light emitting component LE1 generates the first light LL1 with the first light type TL1. For example, the exemplary design DSN2 shown in FIG. 2 may be applied to the first light emitting component LE1 shown in FIG. 1. Namely, the first light controlling unit 130u1 may include a lens, such that the first light emitting component LE1 generates the first light LL1 with the first light type TL1 (as shown in FIG. 3), but not limited thereto. The exemplary design DSN1 shown in FIG. 2 may be applied to the second light emitting component LE2 shown in FIG. 1, such that the second light emitting component LE2 generates the second light LL2 with the second light type TL2 (as shown in FIG. 3), but not limited thereto.

In the embodiment shown in FIG. 1, the second light emitting component LE2 may not include the light controlling unit 130u. Namely, the first light controlling unit 130u1 is not disposed on the second light emitting unit 120b. The first light controlling unit 130u1 is not disposed on the second light emitting unit 120b in the direction Z, such that the light emitted from the second light emitting unit 120b is the second light LL2 with the second light type TL2 of the second light emitting component LE2. For example, the exemplary design DSN1 shown in FIG. 2 may be applied to the second light emitting component LE2 shown in FIG. 1, such that the second light emitting component LE2 generates the second light LL2 with the second light type TL2 (as shown in FIG. 3), but not limited thereto. For example, the first light LL1 with the first light type TL1 generated by the first light emitting component LE1 may be a collimating light, and the second light LL2 with the second light type TL2 generated by the second light emitting component LE2 may be a scattering light, but not limited thereto.

According to some embodiments, as shown in FIG. 1, in the condition that the first light emitting component LE1 includes the first light controlling unit 130u1 disposed on the first light emitting unit 120a in the direction Z (i.e., the light-emitting direction), although the light controlling unit is not disposed on the second light emitting unit 120b in the light-emitting direction (the direction Z) in the second light emitting component LE2, other light controlling unit (not shown in FIG. 1) may be optionally disposed on a side of the second light emitting unit 120b in the side direction (the direction X or the direction Y). The material included in other light controlling unit may include such as a light absorbing material, a light reflecting material, or combination thereof. Other light controlling unit and the first light controlling unit 130u1 may have different shapes and/or different materials.

In the present disclosure, the corresponding relation between the first light emitting unit 120a and the first light controlling unit 130u1 may be designed based on requirement(s), so as to make the first light LL1 generated by the first light emitting component LE1 have suitable first light type TL1. For example, in the first light emitting component LE1 shown in FIG. 1 and FIG. 3, the first light emitting units 120a and the first light controlling units 130u1 are arranged to make them have a one-to-one relation in the direction Z, but not limited thereto. For example, in FIG. 1 and FIG. 3, one first light emitting component LE1 may include one first light controlling unit 130u1, but not limited thereto. For example, in the first light emitting component LE1 shown in FIG. 1, the first light emitting unit 120a may be disposed at the center of the first light controlling unit 130u1 in the direction X and the direction Y, such that the first light controlling unit 130u1 may uniformly collimate the light generated by the first light emitting unit 120a and control the view angle of the light emitting device 100 in the direction X and the direction Y, but not limited thereto.

As shown in FIG. 3 and FIG. 4, in the operation of the light emitting device 100, the light emitting device 100 may have a first lighting mode S1 (or referred as a narrow view mode or a privacy mode) and a second lighting mode S2 (or referred as a wide view mode or a sharing mode), and the light emitting device 100 may be switchable between the first lighting mode S1 and the second lighting mode S2, wherein a viewable angle (i.e., the first view angle VA1) of the light emitting device 100 in the first lighting mode S1 may be less than a viewable angle (i.e., the second view angle VA2) of the light emitting device 100 in the second lighting mode S2.

As shown in FIG. 3 and FIG. 4, in some embodiments, in the first lighting mode S1, the first light emitting unit 120a of the first light emitting component LE1 may be turned on to make the first light emitting component LE1 provide the first light LL1 with the first light type TL1, and the second light emitting unit 120b of the second light emitting component LE2 may be turned off. In the second lighting mode S2, the second light emitting unit 120b of the second light emitting component LE2 may be turned on to make the second light emitting component LE2 provide the second light LL2 with the second light type TL2, and the first light emitting unit 120a of the first light emitting component LE1 may be turned off, but not limited thereto. In some embodiments (not shown in figures), in the first lighting mode S1, the first light emitting unit 120a of the first light emitting component LE1 may be turned on, the second light emitting unit 120b of the second light emitting component LE2 may be turned off; in the second lighting mode S2, both of the first light emitting unit 120a of the first light emitting component LE1 and the second light emitting unit 120b of the second light emitting component LE2 may be turned on, but not limited thereto.

According to some embodiments, in the first lighting mode S1, all of the first light emitting units 120a disposed on the substrate 110 are turned on, and all of the second light emitting units 120b disposed on the substrate 110 are turned off. According to some embodiments, in the second lighting mode S2, all of the second light emitting units 120b disposed on the substrate 110 are turned on, and all of the first light emitting units 120a disposed on the substrate 110 are turned off.

According to some embodiments, in the first lighting mode S1, a first portion of the first light emitting units 120a disposed on the substrate 110 may be turned on, and a portion of the second light emitting units 120b disposed on the substrate 110 may be turned off (but a second portion of the second light emitting units 120b may be turned on). A number of the light emitting units in the first portion may be greater than a number of the light emitting units in the second portion. According to some embodiments, in the second lighting mode S2, a third portion of the second light emitting units 120b disposed on the substrate 110 may be turned on, and a portion of the first light emitting units 120a disposed on the substrate 110 may be turned off (but a fourth portion of the first light emitting units 120a may be turned on). A number of the light emitting units in the third portion may be greater than a number of the light emitting units in the fourth portion.

In some embodiments, the light emitting device 100 may be switched between the lighting modes through a driving circuit (not shown in figures) electrically connected to the light emitting unit 120 of the light emitting component LE, and the driving circuit may be disposed at any suitable position in the light emitting device 100. For example, the driving circuit may be disposed a peripheral region outside the light-emitting region of the light emitting device 100, but not limited thereto. In some embodiments, the light emitting device 100 may further include a conductive trace electrically connected between the light emitting unit 120 and the driving circuit, and the conductive trace may be disposed on the substrate 110 or disposed in the substrate 110. The driving circuit may include a data circuit (data IC), a gate circuit (gate IC), a printed circuit board (PCB), a flexible printed circuit board (FPC), a central processing unit (CPU) or a combination thereof, but not limited thereto.

In the present disclosure, the number and arrangement of the first light emitting components LE1 and the number and arrangement of the second light emitting components LE2 may be designed suitably, such that the light emitting device 100 has a uniform light emitting function in the first lighting mode S1 and the second lighting mode S2 both. In some embodiments, the number of the first light emitting components LE1 may be the same as the number of the second light emitting components LE2, such that the light intensity of the light emitting device 100 in the first lighting mode S1 may be the same as or similar to the light intensity of the light emitting device 100 in the second lighting mode S2, but not limited thereto.

In some embodiments, the first light emitting components LE1 and the second light emitting components LE2 may be evenly distributed in the light emitting device 100, so as to make the light emitting device 100 have the uniform light emitting function in the first lighting mode S1 and the second lighting mode S2. As shown in FIG. 1, the first light emitting components LE1 may be arranged into a plurality of first light emitting columns CL1 and a plurality of first light emitting rows RL1, and the second light emitting components LE2 may be arranged into a plurality of second light emitting columns CL2 and a plurality of second light emitting rows RL2. In detail, the first light emitting column CL1 include a plurality of first light emitting components LE1 arranged in the direction Y (the first direction). The second light emitting column CL2 includes a plurality of second light emitting components LE2 arranged in the direction Y (the first direction). The first light emitting components LE1 of the first light emitting column CL1 and the second light emitting components LE2 of the second light emitting column CL2 are staggered in the direction X (the second direction). The direction Y (the first direction) and the direction X (the second direction) are not parallel to each other (e.g., the direction Y and the direction Y are perpendicular to each other).

As shown in FIG. 1, the first light emitting components LE1 included in the first light emitting row RL1 may be arranged in the direction X (the second direction), the second light emitting components LE2 included in the second light emitting row RL2 may be arranged in the direction X (the second direction), the first light emitting column CL1 and the second light emitting column CL2 may be arranged alongside in the direction X (the second direction), the first light emitting row RL1 and the second light emitting row RL2 may be arranged alongside in the direction Y (the first direction), and the second direction may not be parallel to the first direction, but not limited thereto. For example (as shown in FIG. 1), the first light emitting columns CL1 and the second light emitting columns CL2 are arranged alternately in the direction X (the second direction), and the first light emitting rows RL1 and the second light emitting rows RL2 are arranged alternately in the direction Y (the first direction), but not limited thereto. For instance (as shown in FIG. 1), the first light emitting components LE1 in the first light emitting column CL1 and the second light emitting components LE2 in the second light emitting column CL2 are staggered in the direction X (the second direction), and the first light emitting components LE1 in the first light emitting row RL1 and the second light emitting components LE2 in the second light emitting row RL2 are staggered in the direction Y (the first direction), but not limited thereto. For instance (as shown in FIG. 1), the first light emitting components LE1 may be arranged in an array in the direction X (the second direction) and the direction Y (the first direction), and the second light emitting components LE2 may be arranged in an array in the direction X (the second direction) in the direction Y (the first direction), but not limited thereto.

As shown in FIG. 1, the first light controlling units 130$u$1 of the first light emitting components LE1 may be arranged into a plurality of first light controlling rows RA1 and a plurality of first light controlling columns CA1, wherein the first light controlling units 130$u$1 included in the first light controlling column CA1 may be arranged in the direction Y (the first direction), and the first light controlling units 130$u$1 included in the first light controlling row RA1 may be arranged in the direction X (the second direction), but not limited thereto. For example (as shown in FIG. 1), the first light controlling units 130$u$1 may be arranged in an array in the direction Y (the first direction) and the direction X (the second direction), but not limited thereto.

Figure 5:
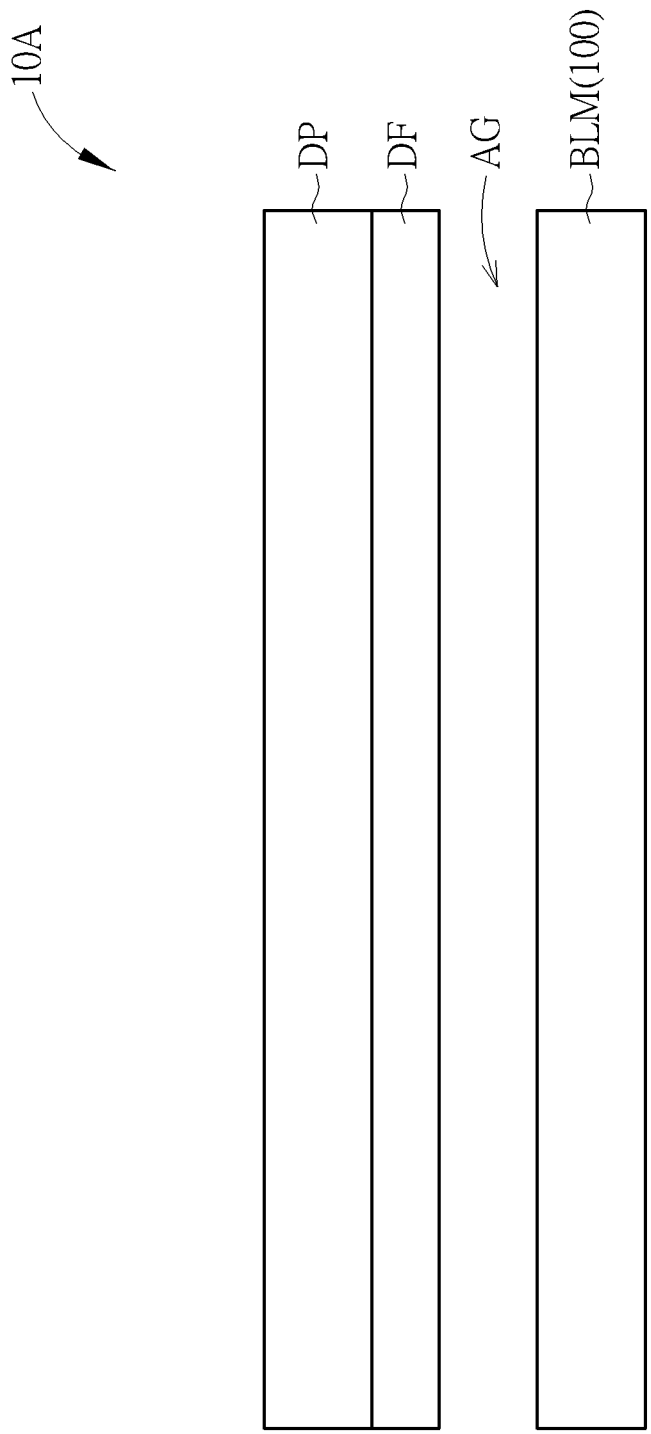
FIG. 5 is a schematic diagram showing a cross-sectional view of an electronic device according to an embodiment of the present disclosure.

FIG. 5 shows the electronic device 10A. The electronic device 10A includes a backlight module BLM and a display panel DP. The backlight module BLM may be a light source providing light for the display panel DP. The backlight module BLM may be designed based on the aforementioned light emitting device 100, and this part will not be redundantly described. According to the above, based on the mode of the backlight module BLM, the backlight module BLM (i.e., the light emitting device 100) may provide the backlight with narrow view angle (e.g., the first lighting mode S1) or the backlight with wide view angle (e.g., the second lighting mode S2). Accordingly, the electronic device 10A using this backlight module BLM (i.e., the light emitting device 100) may have the privacy mode (the first lighting mode S1) with narrower view angle and the sharing mode (the second lighting mode S2) with wider view angle. As shown in FIG. 5, the display panel DP may be a liquid crystal display panel, but not limited thereto.

In FIG. 5, the electronic device 10A may include a light diffuser DF disposed between the display panel DP and the backlight module BLM, so as to uniform the backlight generated by the backlight module BLM (i.e., the light generated by the first light emitting component LE1 and the second light emitting component LE2), and to reduce the poor display phenomenon that may be caused by insufficient density of the light emitting components LE in the backlight module BLM. In FIG. 5, in order to enhance the backlight uniformity, an air gap may exist between the light diffuser DF and the backlight module BLM, and the size (distance) of the air gap AG in the direction Z may be designed based on requirement(s). For example, the distance of the air gap AG in the direction Z may range from 0.1 mm to 10 mm or range from 2 mm to 7 mm, but not limited thereto.

According to the above, in a traditional electronic device with a privacy function, a privacy cell including a privacy medium layer needs to be additional disposed in the traditional electronic device. However, due to the existence of the privacy cell, the light transmittance of the traditional electronic device is decreased. On the contrary, in the electronic device of the present disclosure, through the design of the light emitting component, the light emitting component provides the lights with different light types, such that the electronic device has the privacy mode and the sharing mode. Thus, the privacy cell having the privacy medium layer does not exist in the electronic device of the present disclosure. Compared with the traditional electronic device, the design of the electronic device of the present disclosure may enhance the light transmittance of the electronic device and make the electronic device have the excellent display function.

The light emitting device of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 6:
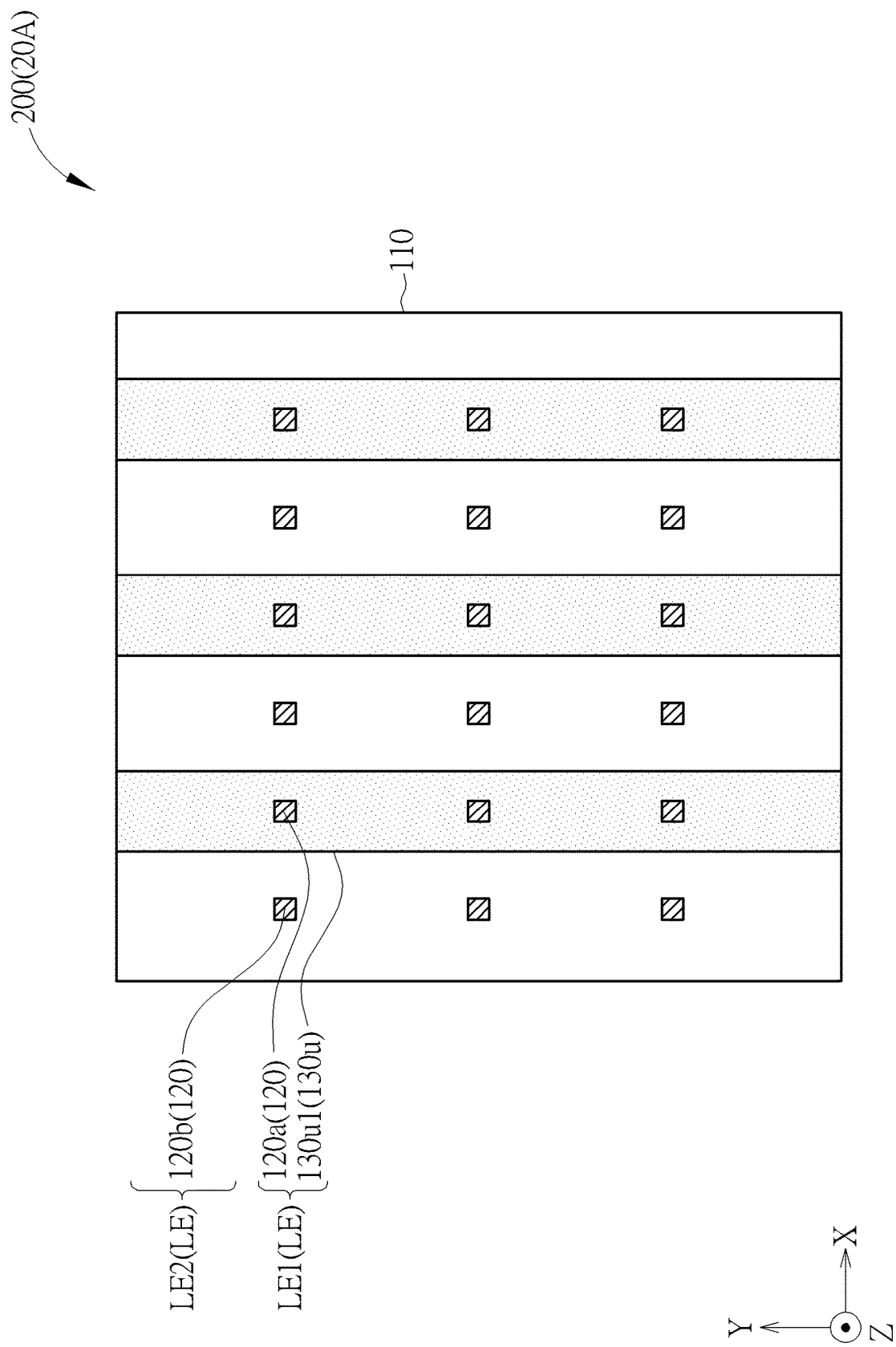
FIG. 6 is a schematic diagram showing a top view of an electronic device according to a second embodiment of the present disclosure.

Referring to FIG. 6, FIG. 6 is a schematic diagram showing a top view of an electronic device 20A according to a second embodiment of the present disclosure. The electronic device 20A includes a light emitting device 200. As shown in FIG. 6, a main difference between this embodiment and the first embodiment is the design of the first light controlling unit 130$u$1. In the light emitting device 200 shown in FIG. 6, the first light emitting component LE1 includes a plurality of first light emitting units 120$a$ and one first light controlling unit 130$u$1. The first light controlling unit 130$u$1 is disposed on the plurality of first light emitting units 120$a$ in the direction Z (the light-emitting direction). In FIG. 6, one first light controlling unit 130$u$1 is disposed on three first light emitting units 120$a$, and the first light controlling unit 130$u$1 extends along the direction Y (the first direction). That is to say, three first light emitting units 120$a$ is corresponding to one first light controlling unit 130$u$1. In the top view, the first light controlling unit 130$u$1 may be a strip structure extending along the direction Y. The first light controlling unit 130$u$1 may cover the first light emitting units 120$a$. For convenience, FIG. 6 only shows that three first light emitting units 120$a$ is corresponding to one first light controlling unit 130$u$1. In other embodiment, the number of the first light emitting units 120$a$ corresponding to one first light controlling unit 130$u$1 is not limited to three.

According to the design of the first light controlling unit 130$u$1 shown in FIG. 6, in the light emitted from the first light emitting unit 120$a$, the first light controlling unit 130$u$1 may adjust a direction of a light component parallel to the direction X in this light to make it approach the direction Z, and the first light controlling unit 130$u$1 may not adjust a direction of a light component parallel to the direction Y in this light. Accordingly, the first light controlling unit 130$u$1 may collimate the light component parallel to the direction X in the light, so as to control the view angle in the direction X.

In the present disclosure, the arrangements of the first light emitting components LE1 and the second light emitting components LE2 may be designed based on requirement(s), and the arrangements the first light emitting units 120$a$ and the second light emitting units 120$b$ may be designed based on requirement(s). For instance (as shown in FIG. 6), the first light emitting units 120$a$ and the second light emitting units 120$b$ may be arranged in an array in the direction X and the direction Y, but not limited thereto. According to some embodiments, the first light emitting units 120$a$ and the second light emitting units 120$b$ may be arranged alternately in the direction X, but not limited thereto. According to some embodiments, as shown in FIG. 6, the first light emitting unit 120$a$ may be aligned with the second light emitting unit 120$b$ in the direction X, but not limited thereto.

Figure 7:
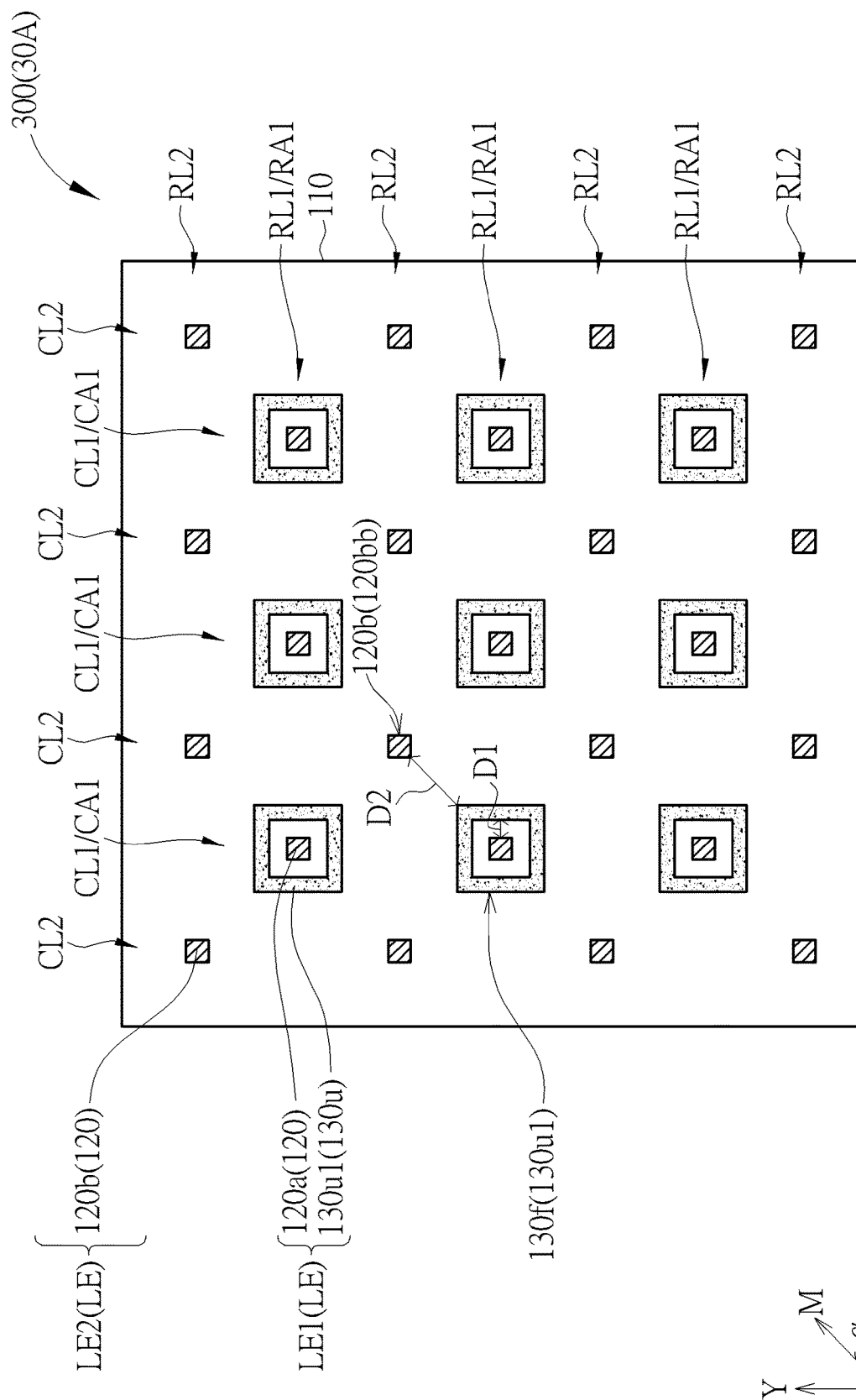
FIG. 7 is a schematic diagram showing a top view of an electronic device according to a third embodiment of the present disclosure.
Figure 8:
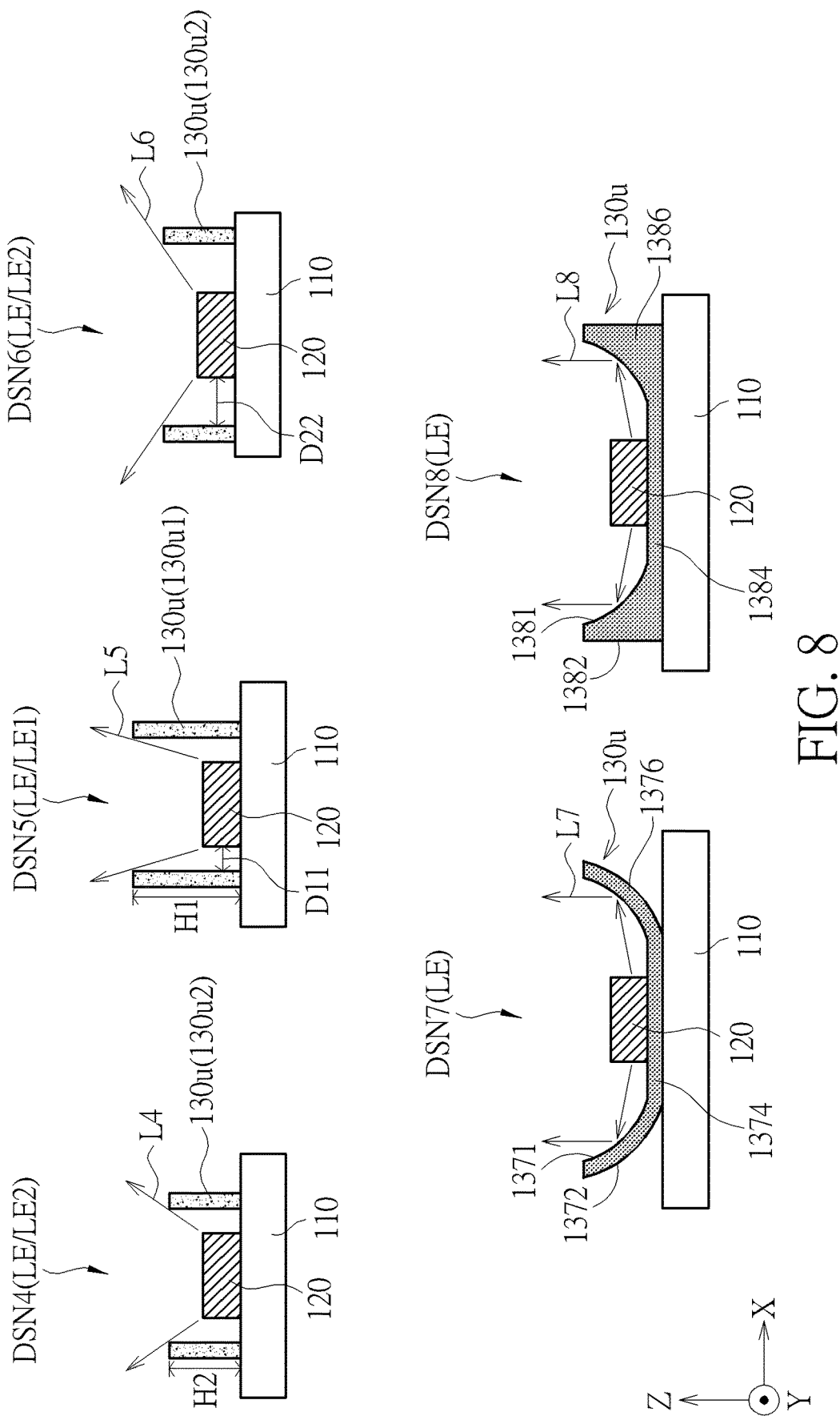
FIG. 8 is a schematic diagram showing cross-sectional views of exemplary designs of light emitting components according to the present disclosure.

Referring to FIG. 7 and FIG. 8, FIG. 7 is a schematic diagram showing a top view of an electronic device 30A according to a third embodiment of the present disclosure, wherein the electronic device 30A includes a light emitting device 300. FIG. 8 is a schematic diagram showing cross-sectional views of exemplary designs of light emitting components according to the present disclosure. As shown in FIG. 7 and FIG. 8, a main difference between this embodiment and the first embodiment is the design of the light controlling unit 130u. In some embodiments, the exemplary designs of the light emitting components LE shown in FIG. 8 and the exemplary design DSN1 of the light emitting component LE shown in FIG. 2 may be applied to the first light emitting component LE1 and/or the second light emitting component LE2 shown in FIG. 7. The detail of the exemplary design DSN1 shown in FIG. 2 may be referred to the above, and this part will not be redundantly described. In an exemplary design DSN4, an exemplary design DSN5, an exemplary design DSN6, an exemplary design DSN7 and an exemplary design DSN8 shown in FIG. 8, the light emitting component LE may include the light emitting unit 120 and the light controlling unit 130u. The light controlling unit 130u may be disposed on at least one side of the light emitting unit 120 in the horizontal direction (i.e., a side direction of the light emitting unit 120), so as to adjust the light emitted from the light emitting unit 120 to form a light L4, a light L5, a light L6, a light L7 or a light L8 with another light type.

In the exemplary design DSN4, the exemplary design DSN5 and the exemplary design DSN6 shown in FIG. 8, the light controlling unit 130u may include a blocking wall configured to absorb the light emitted from the light emitting unit 120 and having an angle greater than a specific value and respecting to the direction Z. In some embodiments, the blocking wall may include a light absorbing material. For example, the light absorbing material of the blocking wall of the light controlling unit 130u may include black photoresist, black ink, black resin, black pigment, other suitable light absorbing material or a combination thereof, so as to make the light controlling unit 130u be a passive light controlling unit, but not limited thereto. In some embodiments, the material of the blocking wall of the light controlling unit 130u may include a polymer dispersed liquid crystal (PDLC) unit, a polymer network liquid crystal (PNLC) unit, other suitable material or a combination thereof, such that light controlling unit 130u may control the light through electric signal(s) and serve as an electrically controlled light-controlling unit (or referred as an active light controlling unit).

As shown in FIG. 8, the exemplary designs DSN4, DSN5 and DSN6 may be applied to the first light emitting component LE1 and the second light emitting component LE2 of the present disclosure. A first height H1 of the light controlling unit 130u in the exemplary design DSN5 is greater than a second height H2 of the light controlling unit 130u in the exemplary design DSN4, such that the collimating degree of the light L5 generated by the light emitting component LE in the exemplary design DSN5 is greater than the collimating degree of the light L4 generated by the light emitting component LE in the exemplary design DSN4. A distance D22 between the light controlling unit 130u and the light emitting unit 120 in the exemplary design DSN6 is greater than a distance D11 between the light controlling unit 130u and the light emitting unit 120 in the exemplary design DSN5, such that the collimating degree of the light L5 generated by the exemplary design DSN5 is greater than the collimating degree of the light L6 of the exemplary design DSN6. In the present disclosure, the distance between the light controlling unit 130u and the light emitting unit 120 is their minimum distance.

According to the exemplary designs DSN7 and DSN8 shown in FIG. 8, the light controlling unit 130u may include a reflective structure configured to reflect the light generated by the light emitting unit 120. In some embodiments, the light controlling unit 130u of the exemplary design DSN7 and the light controlling unit 130u of the exemplary design DSN8 may include a reflective material (e.g., metal), such that the light controlling unit 130u has a reflective surface to be a reflective structure. For example, the light controlling unit 130u of the exemplary design DSN7 and the light controlling unit 130u of the exemplary design DSN8 may include a curved reflective structure (e.g., a curved surface reflector), but not limited thereto. For example, the curved surface of the curved reflective structure may be a spherical surface, a parabolic surface or other suitable curved surface. For example, in the exemplary design DSN7, an inner surface 1371 of the light controlling unit 130u includes a curved surface for reflecting light, and an outer surface 1372 of the light controlling unit 130u includes a curved surface. In the exemplary design DSN8, an inner surface 1381 of the light controlling unit 130u includes a curved surface for reflecting light, and an outer surface 1382 of the light controlling unit 130u includes a plane (e.g., a plane perpendicular to the substrate 110), but not limited thereto. Accordingly, in the exemplary designs DSN7 and DSN8, the light controlling units 130u may reflect the light generated by the light emitting units 120 and having an angle greater than a specific value and respecting to the direction Z, such that the light emitting components LE generate the collimated light L7 and the collimated light L8 respectively. In the present disclosure, the exemplary designs DSN7 and DSN8 may be applied to the first light emitting component LE1 or the second light emitting component LE2 of any embodiment of the present disclosure. According to some embodiments, the exemplary designs DSN7 and DSN8 may be applied to the second light emitting component LE2 of any embodiment of the present disclosure, so as to provide the second light LL2 having the wider view angle (e.g., the second view angle VA2), as shown in FIG. 3.

According to some embodiments, in the exemplary design DSN4, the exemplary design DSN5 and the exemplary design DSN6 shown in FIG. 8, the material of the light controlling unit 130u does not exist at a surface in contact with the bottom of the light emitting unit 120. Namely, the material of the surface in contact with the bottom of the light emitting unit 120 is different from the material of the light controlling unit 130u. According to some embodiments, in the exemplary design DSN7 and the exemplary design DSN8 shown in FIG. 8, the light emitting unit 120 may be disposed on a portion of the light controlling unit 130u (e.g., a bottom 1374 and a bottom 1384), and another portion of the light controlling unit 130u (e.g., a sidewall 1376 and a sidewall 1386) may be disposed on at least one side of the light emitting unit 120 in the horizontal direction (i.e., the side direction of the light emitting unit 120).

As shown in FIG. 7, the light emitting device 300 includes a plurality of light controlling units 130u disposed on the substrate 110. The first light emitting component LE1 is disposed on the substrate 110, the first light emitting component LE1 includes the first light emitting unit 120a and the first light controlling unit 130u1, and the first light controlling unit 130u1 is disposed on a side of the first light emitting unit 120a in the side direction (the horizontal direction, the direction on the XY surface) to adjust the light emitted from the first light emitting unit 120a, such that the first light emitting component LE1 generates the first light LL1 with the first light type TL1. For example, the exemplary design DSN4, the exemplary design DSN5 or the exemplary design DSN6 shown in FIG. 8 may be applied to the first light emitting component LE1 shown in FIG. 7, but not limited thereto. The plurality of light controlling units 130u includes the first light controlling unit 130u1. The second light emitting component LE2 is disposed on the substrate 110, and the second light emitting component includes the second light emitting unit 120b. The first light emitting component LE1 may provide the first light LL1 with the first light type TL1, such as the exemplary design DSN5 shown in FIG. 8. The second light emitting component LE2 may provide the second light LL2 with the second light type TL2, such as the exemplary design DSN1 shown in FIG. 2. The first light type TL1 is different from the second light type TL2. As shown in FIG. 7, the first light controlling unit 130u1 may include the light absorbing material. The light absorbing material may be the blocking wall configured to absorb the light emitted from the light emitting unit 120 and having an angle greater than a specific value and respecting to the direction Z. The light absorbing material may include black photoresist, black ink, black resin, black pigment, other suitable light absorbing material or a combination thereof.

As shown in FIG. 7, one of the light controlling units 130u closest to the second light emitting unit 120b is a reference light controlling unit 130f. The first light emitting component LE1 or the second light emitting component LE2 includes the reference light controlling unit 130f. As an example, FIG. 7 shows a second light emitting unit 120bb and a reference light controlling unit 130f closest to the second light emitting unit 120bb. In this embodiment, the reference light controlling unit 130f is the first light controlling unit 130u1. A first distance D1 between the first light emitting unit 120a and the first light controlling unit 130u1 is different from a second distance D2 between the second light emitting unit 120bb and the reference light controlling unit 130f (the closest first light controlling unit 130u1). For instance, as shown in FIG. 7, the first distance D1 may be less than the second distance D2, but not limited thereto. For example, in FIG. 7, the first distance D1 may be measured along the direction X (or the direction Y), the second distance D2 may be measured along a direction M, wherein the direction M is a horizontal direction (perpendicular to the direction Z) not parallel to the direction X and the direction Y, but not limited thereto. Note that an angle α between the direction M and the direction X may be greater than 0 degrees and less than 90 degrees (i.e., an acute angle) or be greater than 90 degrees and less than 180 degrees (i.e., an obtuse angle). For example, the angle α shown in FIG. 7 is an acute angle. Note that the measuring directions of the first distance D1 and the second distance D2 may be changed according to the design of the light controlling unit(s) 130u and the arrangement of the light emitting components LE.

For example, in FIG. 7, the first light controlling unit 130u1 may surround the first light emitting unit 120a to absorb the light emitted from the first light emitting unit 120a and having an angle greater than a specific value and respecting to the direction Z, so as to control the view angle in the direction X and the direction Y, but not limited thereto. In the embodiment shown in FIG. 7, the second light emitting component LE2 may not include the light controlling unit 130u, such that the second light LL2 with the second light type TL2 generated by the second light emitting component LE2 is the light emitted from the second light emitting unit 120b. For example, the exemplary design DSN1 shown in FIG. 2 may be applied to the second light emitting component LE2 shown in FIG. 7, such that second light emitting component LE2 generates the second light LL2 with the second light type TL2, but not limited thereto. The collimating degree of the first light LL1 generated by the first light emitting component LE1 is greater than the collimating degree of the second light LL2 generated by the second light emitting component LE2, but not limited thereto.

Figure 9:
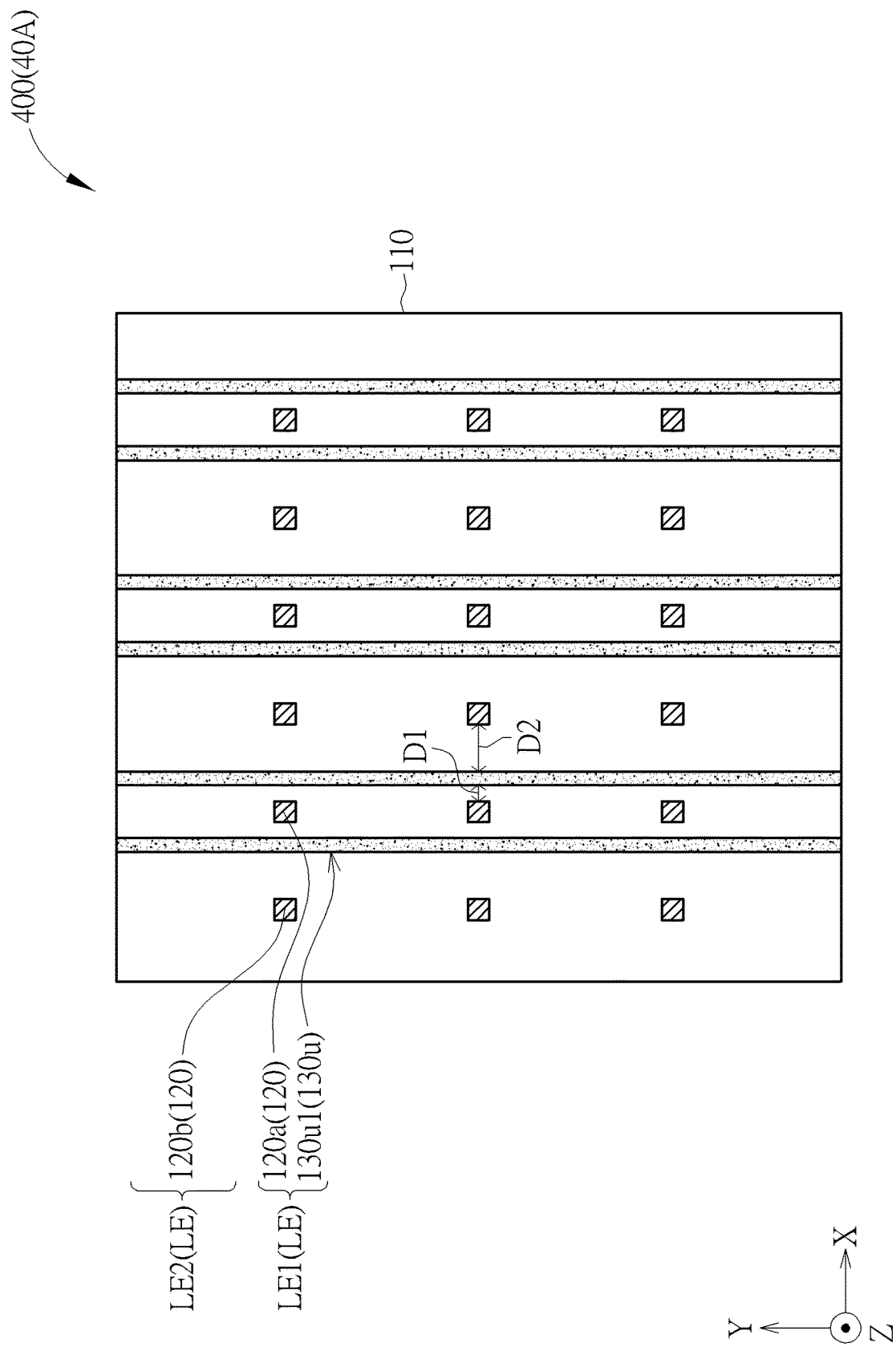
FIG. 9 is a schematic diagram showing a top view of an electronic device according to a fourth embodiment of the present disclosure.

Referring to FIG. 9, FIG. 9 is a schematic diagram showing a top view of an electronic device 40A according to a fourth embodiment of the present disclosure. The electronic device 40A includes a light emitting device 400. As shown in FIG. 9, a main difference between this embodiment and the third embodiment is the design of the first light controlling unit 130u1. In the light emitting device 400 shown in FIG. 9, the first light emitting component LE1 includes a plurality of first light emitting units 120a and one first light controlling unit 130u1, and the first light controlling unit 130u1 is disposed on a side of the first light emitting units 120a in the side direction (i.e., the horizontal direction, the direction on the XY surface). In FIG. 9, one first light controlling unit 130u1 is disposed on a side of three first light emitting units 120a in the side direction (i.e., the horizontal direction, the direction on the XY surface) and extends along the direction Y (the first direction). Namely, three first light emitting units 120a is corresponding to one first light controlling unit 130u1. As shown in FIG. 9, one first light controlling unit 130u1 may include two strip structures (the strip blocking walls) extending along the direction Y, and these strip structures are arranged alongside in the direction X, but not limited thereto. According to the design of the first light controlling unit 130u1 shown in FIG. 9, the first light controlling unit 130u1 may absorb and adjust the light generated by the first light emitting unit 120a in the direction X, so as to achieve the collimating effect and control the view angle in the direction X.

In the present disclosure, the arrangements of the first light emitting components LE1 and the second light emitting components LE2 may be designed based on requirement(s), and the arrangements of the first light emitting units 120a and the second light emitting units 120b may be designed based on requirement(s). For example (as shown in FIG. 9), the first light emitting units 120a and the second light emitting units 120b may be arranged in an array in the direction X and the direction Y, but not limited thereto. For example (as shown in FIG. 9), the first light emitting units 120a and the second light emitting units 120b may be arranged alternately in the direction X, but not limited thereto. For example (as shown in FIG. 9), the first light emitting unit 120a may be aligned with the second light emitting unit 120b in the direction X, but not limited thereto. In FIG. 9, the first distance D1 and the second distance D2 may be measured along the direction X, but not limited thereto.

Figure 10:
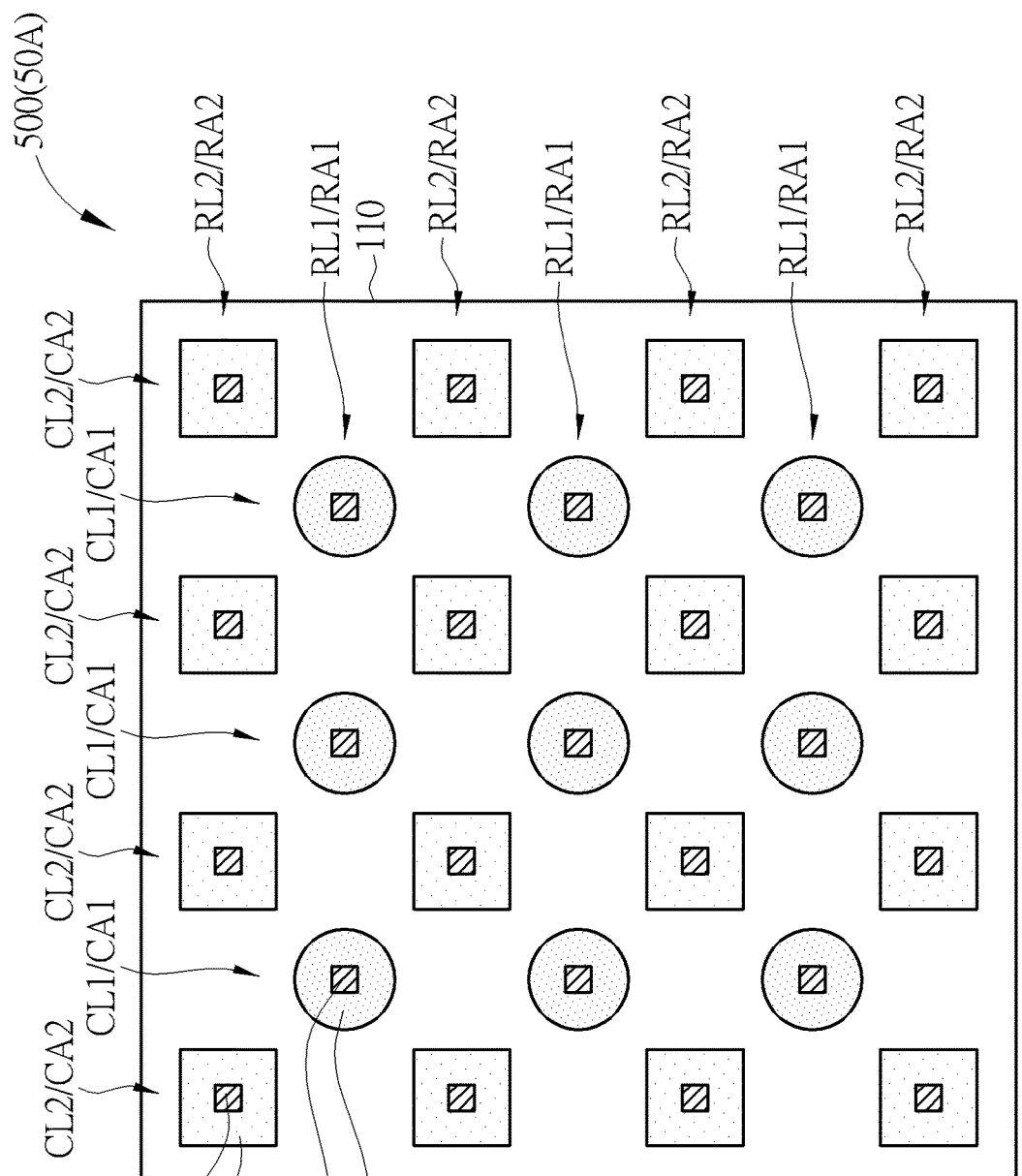
FIG. 10 is a schematic diagram showing a top view of an electronic device according to a fifth embodiment of the present disclosure.

Referring to FIG. 10, FIG. 10 is a schematic diagram showing a top view of an electronic device 50A according to a fifth embodiment of the present disclosure. The electronic device 50A includes a light emitting device 500. As shown in FIG. 10, a main difference between this embodiment and the first embodiment is that the light controlling units 130u of the light emitting device 500 of the present disclosure may be divided into a plurality of first light controlling units 130u1 and a plurality of second light controlling units 130u2. The first light controlling unit 130u1 may be included in the first light emitting component LE1 and adjust the light emitted from the first light emitting unit 120a, such that the first light emitting component LE1 generates the first light LL1 with the first light type TL1. The second light controlling unit 130u2 may be included in the second light emitting component LE2 and adjust the light emitted from the second light emitting unit 120b, such that the second light emitting component LE2 generates the second light LL2 with the second light type TL2. The aforementioned exemplary designs (as shown in FIG. 2 and FIG. 8) or the aforementioned embodiments (as shown in FIG. 1, FIG. 6, FIG. 7 and FIG. 9) may be applied to the first light controlling unit 130u1 and/or the second light controlling unit 130u2 based on requirement(s).

As shown in FIG. 10, in some embodiments, the first light controlling unit 130u1 of the first light emitting component LE1 may be disposed on the first light emitting unit 120a in the direction Z (i.e., the light-emitting direction), and the second light emitting component LE2 may further include the second light controlling unit 130u2 disposed on the second light emitting unit 120b in the direction Z (i.e., the light-emitting direction). In FIG. 10, the first light controlling unit 130u1 may be different from the second light controlling unit 130u2, such that the first light type TL1 of the first light LL1 generated by the first light emitting component LE1 may be different from the second light type TL2 of the second light LL2 generated by the second light emitting component LE2. In some embodiments (as shown in FIG. 10), the first light controlling unit 130u1 and the second light controlling unit 130u2 may be different optical films. For example, the first light controlling unit 130u1 includes a lens of the exemplary design DSN2 shown in FIG. 2, and the second light controlling unit 130u2 includes a prism of the exemplary design DSN3 shown in FIG. 2, but not limited thereto. For example, the first light controlling unit 130u1 and the second light controlling unit 130u2 may include different lenses, but not limited thereto. For example, the first light controlling unit 130u1 and the second light controlling unit 130u2 may respective include liquid crystal lenses, and the liquid crystal lens of the first light controlling unit 130u1 and liquid crystal lens of the second light controlling unit 130u2 may be driven by different electric signals, but not limited thereto. In some embodiments (as shown in FIG. 10), the collimating degree of the first light LL1 generated by the first light emitting component LE1 may be greater than the collimating degree of the second light LL2 generated by the second light emitting component LE2, but not limited thereto.

In some embodiments (as shown in FIG. 10), the first light emitting unit 120a and the first light controlling unit 130u1 are arranged in a one-to-one corresponding manner in the direction Z, and the second light emitting unit 120b and the second light controlling unit 130u2 are arranged in a one-to-one corresponding manner in the direction Z, but not limited thereto. For example, the first light emitting unit 120a may be disposed at a center of the first light controlling unit 130u1 in the direction X and the direction Y, and the second light emitting unit 120b may be disposed at a center of the second light controlling unit 130u2 in the direction X and the direction Y, but not limited thereto.

In the arrangement of the second light controlling units 130u2 of the second light emitting components LE2, the second light controlling unit 130u2 may be arranged into a plurality of second light controlling rows RA2 and a plurality of second light controlling columns CA2, wherein the second light controlling columns CA2 may be arranged alongside in the direction X, the second light controlling rows RA2 may be arranged alongside in the direction Y, the second light controlling units 130u2 included in the second light controlling column CA2 may be arranged in the direction Y, and the second light controlling units 130u2 included in the second light controlling row RA2 may be arranged in the direction X, but not limited thereto. For instance (as shown in FIG. 10), the second light controlling units 130u2 may be arranged in an array in the direction X and the direction Y, but not limited thereto.

Figure 11:
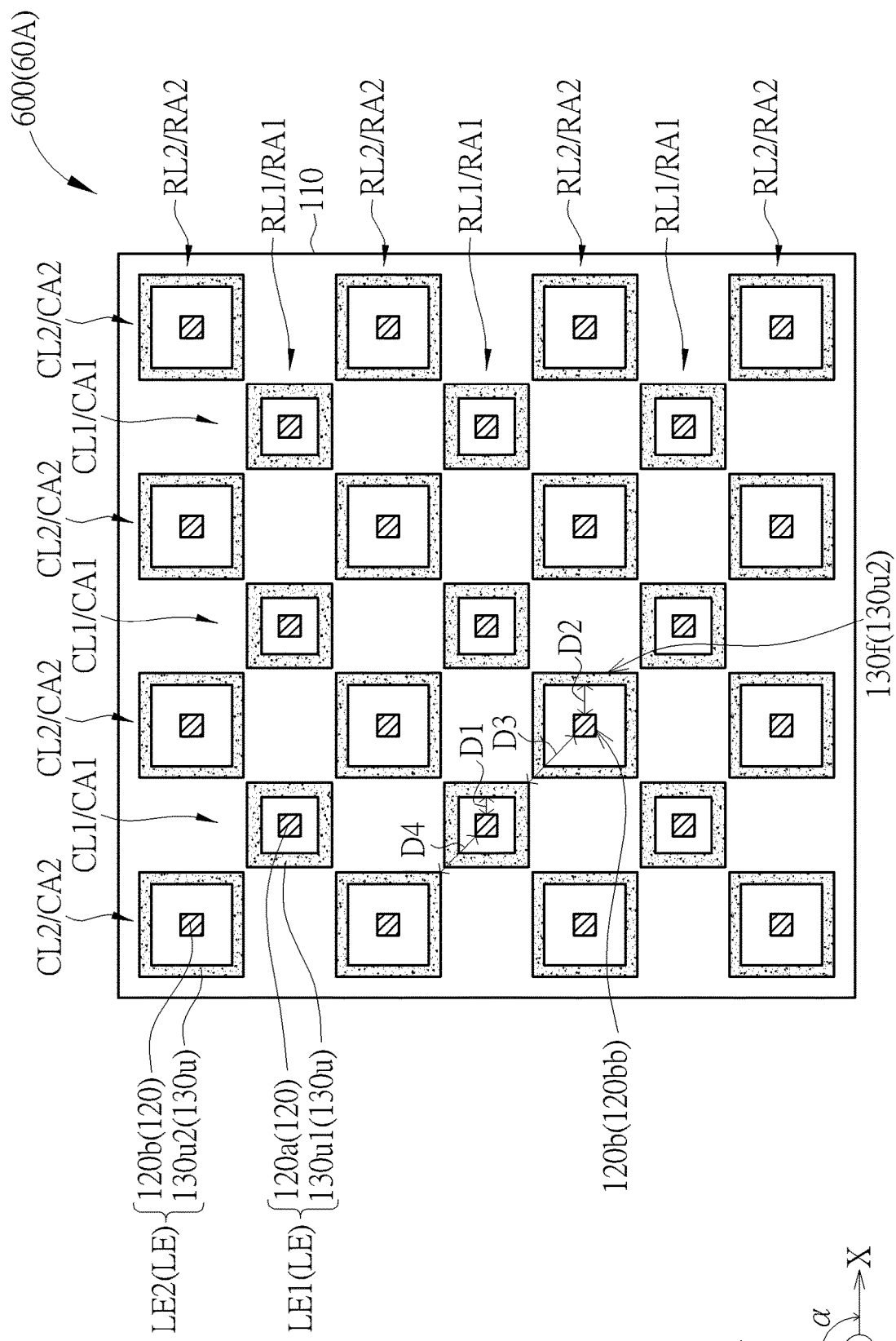
FIG. 11 is a schematic diagram showing a top view of an electronic device according to a sixth embodiment of the present disclosure.

Referring to FIG. 11, FIG. 11 is a schematic diagram showing a top view of an electronic device 60A according to a sixth embodiment of the present disclosure. The electronic device 60A includes a light emitting device 600. As shown in FIG. 11, a main difference between this embodiment and the fifth embodiment is the design of the first light controlling unit 130u1 and the design of the second light controlling unit 130u2. In the light emitting device 600 shown in FIG. 11, the detail of the first light controlling unit 130u1 may be referred to the third embodiment (as shown in FIG. 7) of the present disclosure, and this part will not be redundantly described. In FIG. 11, the second light emitting component LE2 includes the second light controlling unit 130u2, the second light controlling unit 130u2 is disposed on a side of the second light emitting unit 120b in the side direction (i.e., the horizontal direction and/or the direction on the XY surface). The side direction is not parallel to the direction Z (the light-emitting direction). For instance, the second light controlling unit 130u2 may surround the second light emitting unit 120b to absorb the light emitted from the second light emitting unit 120b and having an angle greater than another specific value and respecting to the direction Z, so as to control the view angle in the direction X and the direction Y, but not limited thereto. Since the light emitting device 600 has the second light controlling unit 130u2, in an example of the second light emitting unit 120bb and the reference light controlling unit 130f closest to the second light emitting unit 120bb shown in FIG. 11, the reference light controlling unit 130f is the second light controlling unit 130u2.

In the present disclosure, the first light type TL1 of the first light LL1 and the second light type TL2 of the second light LL2 may be adjusted through the distance between the light controlling unit 130u and the light emitting unit 120 and/or the height of the light controlling unit 130u. As shown in FIG. 8 and FIG. 11, according to some embodiments, the exemplary design DSN5 shown in FIG. 8 may be applied to the first light emitting component LE1, and the exemplary design DSN4 shown in FIG. 8 may be applied to the second light emitting component LE2. Namely, in the direction Z (the light-emitting direction), the first light controlling unit 130u1 of the first light emitting component LE1 has the first height H1 (as shown in the exemplary design DSN5 of FIG. 8), the second light controlling unit 130u2 of the second light emitting component LE2 has the second height H2 (as shown in the exemplary design DSN4 of FIG. 8), and the first height H1 is different from the second height H2. According to some embodiments, the first height H1 is greater than the second height H2. A ratio of the first height H1 of the first light controlling unit 130u1 to the second height H2 of the second light controlling unit 130u2 may range from 1.5 to 5 (e.g., range from 2 to 3), but not limited thereto.

As shown in FIG. 8 and FIG. 11, according to some embodiments, the exemplary design DSN5 shown in FIG. 8 may be applied to the first light emitting component LE1 shown in FIG. 11, and the exemplary design DSN6 shown in FIG. 8 may be applied to the second light emitting component LE2 shown in FIG. 11. In detail, in the first light emitting component LE1 of FIG. 11, the first distance D1 exists between the first light controlling unit 130u1 and the first light emitting unit 120a (or referred to the distance D11 of the exemplary design DSN5 shown in FIG. 8). In the second light emitting component LE2 shown in FIG. 11, the second distance D2 exists between the second light controlling unit 130*u*2 (i.e., the reference light controlling unit 130*f*) and the second light emitting unit 120*b* (or referred to the distance D22 of the exemplary design DSN6 shown in FIG. 8). The first distance D1 is different from the second distance D2. According to some embodiments, the first distance D1 may be less than the second distance D2. In some embodiments, a ratio of the second distance D2 to the first distance D1 may range from 1.5 to 5 (e.g., range from 2 to 3), but not limited thereto. For instance (as shown in FIG. 11), the first distance D1 and the second distance D2 may be measured along the direction X (or the direction Y), but not limited thereto. In some embodiments, the collimating degree of the first light LL1 generated by the first light emitting component LE1 may be greater than the collimating degree of the second light LL2 generated by the second light emitting component LE2, but not limited thereto.

As shown in FIG. 11, a third distance D3 exists between the second light emitting unit 120*b* and the first light controlling unit 130*u*1, and the first distance D1 may be less than the third distance D3, but not limited thereto. As shown in FIG. 11, a fourth distance D4 exists between the first light emitting unit 120*a* and the second light controlling unit 130*u*2, and the second distance D2 may be less than the fourth distance D4, but not limited thereto. For instance (as shown in FIG. 11), the third distance D3 and the fourth distance D4 may be measured along a direction M, and an angle α between the direction M and the direction X may be an obtuse angle, but not limited thereto.

Figure 12:
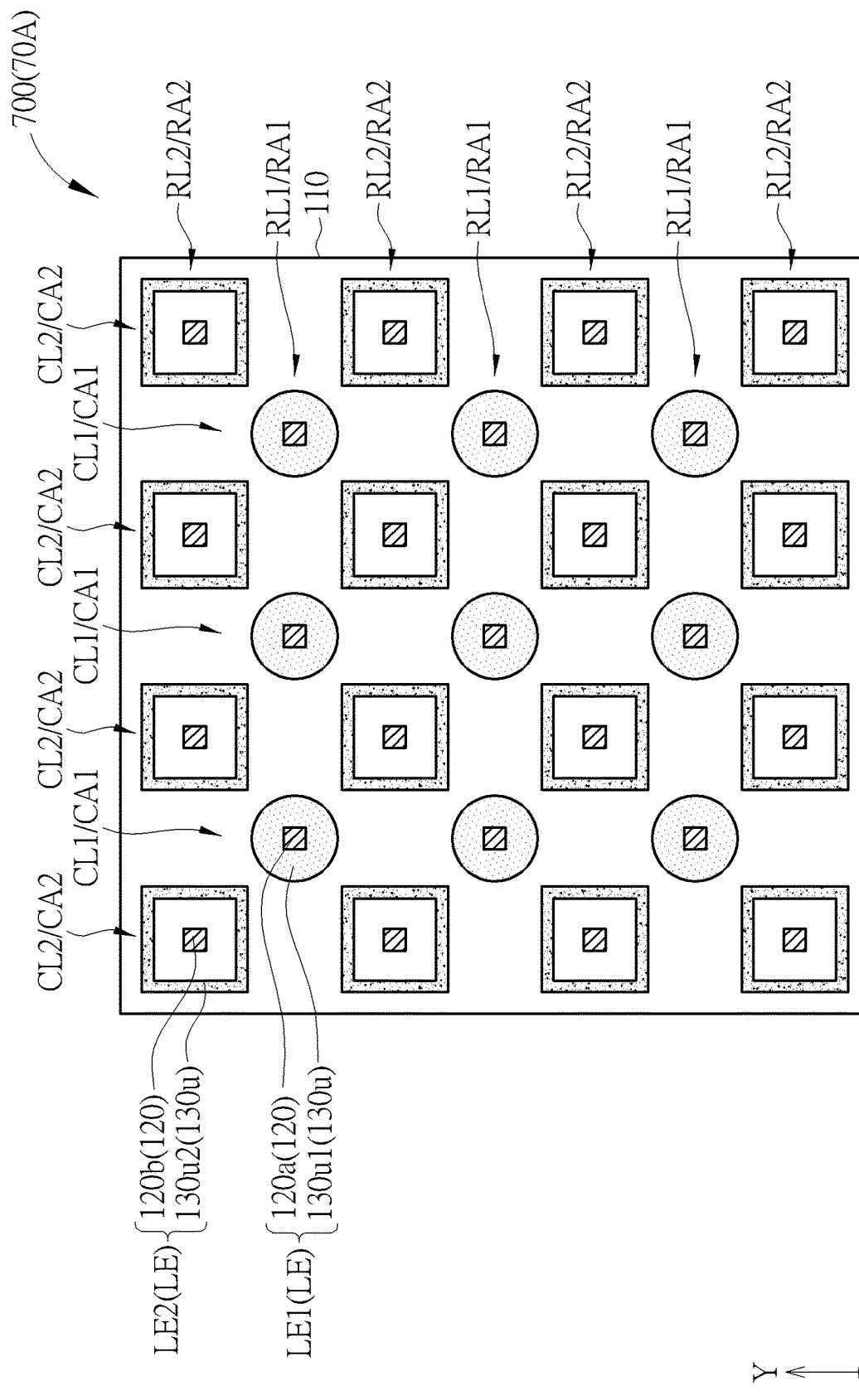
FIG. 12 is a schematic diagram showing a top view of an electronic device according to a seventh embodiment of the present disclosure.

Referring to FIG. 12, FIG. 12 is a schematic diagram showing a top view of an electronic device 70A according to a seventh embodiment of the present disclosure. The electronic device 70A includes a light emitting device 700. As shown in FIG. 12, a main difference between this embodiment and the fifth embodiment (FIG. 10) is the design of the second light controlling unit 130*u*2. In the light emitting device 700 shown in FIG. 12, the first light controlling unit 130*u*1 of the first light emitting component LE1 may be disposed on the first light emitting unit 120*a* in the direction Z (i.e., the light-emitting direction). The second light emitting component LE2 includes the second light controlling unit 130*u*2 disposed on a side of the second light emitting unit 120*b* in the side direction (i.e., the horizontal direction and/or the direction on the XY surface), but not limited thereto. In some embodiments, the first light controlling unit 130*u*1 may include an optical film (e.g., a lens or a prism), and the second light controlling unit 130*u*2 may include a blocking wall configured to absorb light and containing a light absorbing material, but not limited thereto.

In the light emitting device of some embodiments (not shown in figures), the first light controlling unit 130*u*1 of the first light emitting component LE1 may be disposed on a side of the first light emitting unit 120*a* in the side direction (i.e., the horizontal direction and/or the direction on the XY surface), and the second light controlling unit 130*u*2 of the second light emitting component LE2 may be disposed on the second light emitting unit 120*b* in the direction Z (i.e., the light-emitting direction), but not limited thereto. In some embodiments, the first light controlling unit 130*u*1 may include a blocking wall configured to absorb light and containing a light absorbing material, and the second light controlling unit 130*u*2 may include an optical film (e.g., a lens or a prism), but not limited thereto.

Figure 13:
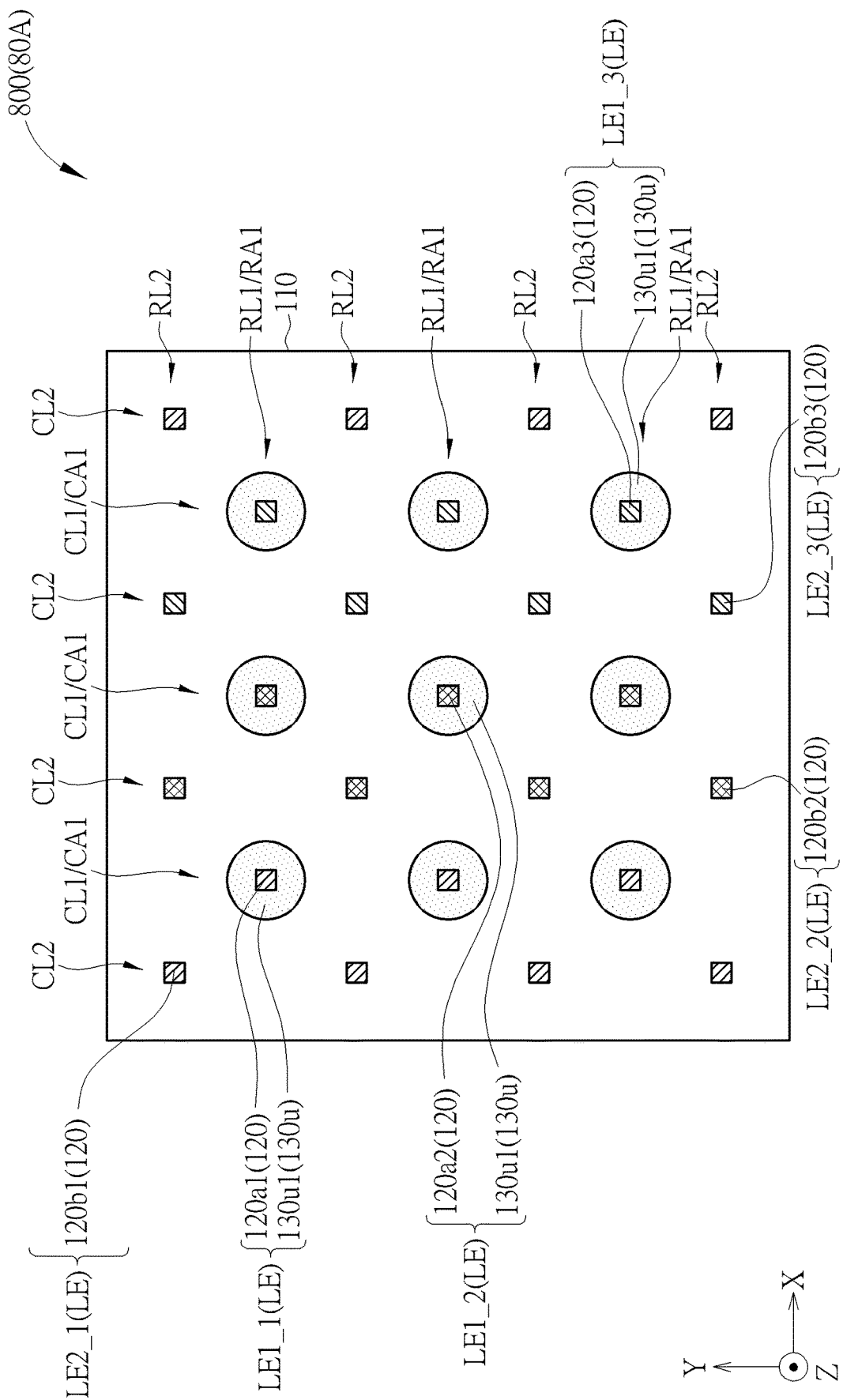
FIG. 13 is a schematic diagram showing a top view of an electronic device according to an eighth embodiment of the present disclosure.

Referring to FIG. 13, FIG. 13 is a schematic diagram showing a top view of an electronic device 80A according to an eighth embodiment of the present disclosure. The electronic device 80A includes a light emitting device 800. As shown in FIG. 13, a main difference between this embodiment and the first embodiment is the design of the light emitting unit 120. The light emitting device 800 shown in FIG. 13 may include a plurality kinds of first light emitting components LE1 and a plurality kinds of the second light emitting components LE2. Different kinds of the first light emitting components LE1 may respectively include the first light emitting units 120*a* emitting the lights with different colors, and different kinds of the second light emitting components LE2 may respectively include the second light emitting units 120*b* emitting the lights with different colors. For example (as shown in FIG. 13), the light emitting device 800 may include three kinds of the first light emitting components LE1 (e.g., the first light emitting component LE1_1, the first light emitting component LE1_2 and the first light emitting component LE1_3) and three kinds of the second light emitting components LE2 (e.g., the second light emitting component LE2_1, the second light emitting component LE2_2 and the second light emitting component LE2_3), wherein the first light emitting unit 120*a*1 of the first light emitting component LE1_1 and the second light emitting unit 120*b*1 of the second light emitting component LE2_1 may emit lights with a first color (e.g., red), the first light emitting unit 120*a*2 of the first light emitting component LE1_2 and the second light emitting unit 120*b*2 of the second light emitting component LE2_2 may emit lights with a second color (e.g., green), and the first light emitting unit 120*a*3 of the first light emitting component LE1_3 and the second light emitting unit 120*b*3 of the second light emitting component LE2_3 may emit lights with a third color (e.g., blue), but not limited thereto.

For example (not shown in figures), one first light emitting component LE1 may include a plurality of first light emitting units 120*a* respectively emitting the lights with different colors, and one of the first light controlling units 130*u*1 in this the first light emitting component LE1 may be corresponding to these first light emitting units 120*a* emitting the lights with different colors; one second light emitting component LE2 may include a plurality of second light emitting units 120*b* respectively emitting the lights with different colors, and if this second light emitting component LE2 has one second light controlling unit 130*u*2, this second light controlling unit 130*u*2 may be corresponding to these the second light emitting units 120*b* emitting the lights with different colors, but not limited thereto.

In summary, in the electronic device of the present disclosure, owing to the designs of the light emitting components, the light emitting components provides the lights with different light types, such that the electronic device has the privacy mode and the sharing mode. According to some embodiments, the first light emitting component and the second light emitting component provides the lights with different light types through the light adjustment of the light controlling unit(s) in the light emitting component(s). Also, through the control of turning on/off the first light emitting component and turning on/off the second light emitting component, the light emitting device has different lighting modes to make the light emitting device have the privacy function. Compared with the traditional electronic device, the privacy cell having the privacy medium layer does not exist in the electronic device of the present disclosure, so as to enhance the light transmittance of the electronic device and make the electronic device have the excellent display function.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising a light emitting device, wherein the light emitting device emits a light towards a light-emitting direction, and the light emitting device comprises:
    a substrate;
    a plurality of light controlling units disposed on the substrate;
    a first light emitting component disposed on the substrate, the first light emitting component comprising a first light emitting unit and a first light controlling unit, wherein the first light controlling unit disposed on a side of the first light emitting unit in a side direction of the first light emitting unit, the side direction of the first light emitting unit is not parallel to the light-emitting direction, the plurality of light controlling units comprise the first light controlling unit, and the first light emitting component provides a first light with a first light type; and
    a second light emitting component disposed on the substrate, the second light emitting component comprising a second light emitting unit, wherein the second light emitting component provides a second light with a second light type, and the first light type is different from the second light type;
    wherein a reference light controlling unit is one light controlling unit among the plurality of light controlling units closest to the second light emitting unit, the first light emitting component or the second light emitting component comprises the reference light controlling unit, and a first distance between the first light emitting unit and the first light controlling unit is different from a second distance between the second light emitting unit and the reference light controlling unit.

2. The electronic device according to claim 1, wherein the reference light controlling unit is the first light controlling unit.

3. The electronic device according to claim 1, wherein the second light emitting component comprises a second light controlling unit, the second light controlling unit is disposed on a side of the second light emitting unit in a side direction of the second light emitting unit, the side direction of the second light emitting unit is not parallel to the light-emitting direction, and the reference light controlling unit is the second light controlling unit.

4. The electronic device according to claim 3, wherein a first height of the first light controlling unit is greater than a second height of the second light controlling unit in the light-emitting direction.

5. The electronic device according to claim 1, wherein the first light controlling unit comprises a light absorbing material.

6. The electronic device according to claim 1, wherein the first light controlling unit surrounds the first light emitting unit.

7. The electronic device according to claim 1, wherein the first light of the first light emitting component has a first view angle, the second light of the second light emitting component has a second view angle, and the first view angle is less than the second view angle.

8. The electronic device according to claim 1, wherein the first light emitting unit is turned on and the second light emitting unit is turned off in a first lighting mode.

9. The electronic device according to claim 1, wherein the second light emitting unit is turned on and the first light emitting unit is turned off in a second lighting mode.

10. The electronic device according to claim 1, wherein the first light controlling unit comprises two strip structures.

* * * * *